3,389,156
PROCESS FOR ISOMERIZING UNSATURATED FATTY ACIDS OR DERIVATIVES THEREOF
Victor Lewis Larimer, Bloomington, Minn., assignor to Ashland Oil and Refining Company, a corporation of Kentucky
No Drawing. Filed Mar. 22, 1965, Ser. No. 441,869
6 Claims. (Cl. 260—405.6)

ABSTRACT OF THE DISCLOSURE

Unsaturated fatty acids having 12–26 carbon atoms, such as oleic acid, are isomerized by contacting the same at 500–700° F. with a catalyst obtained by depositing phosphoric acid on a micro-porous glass, e.g. pumice.

---

This invention relates to a process for treating unsaturated fatty acids or derivatives thereof, and more particularly to the isomerization of fatty acids and their derivatives from their cis- form to the trans- form and also isomerizations involving the shifting of double bonds.

Most naturally occurring fatty compounds contain the unsaturated fatty acid radical in the cis- form. Conversion of the cis- form to the trans- form results in an increase in the melting point of the fatty compound and thus causes a hardening of the fatty material without resorting to hydrogenation. Isomerization of the fatty compound to the trans- form furthermore increases the reactivity of the fatty compound in further reactions, such as polymerization and Diels Alder reactions, improving, for example, the drying properties of such fatty compounds. Additionally, the detergency of fatty acids isomerized to the trans- form and then transformed into soaps is increased by the isomerization of the fatty acid from the cis-isomeric form to the trans-isomeric form. The shift in the double bond, particularly if the shift is toward the methyl end of the fatty acid molecule, results in increased reactivity of such compounds in reactions involving addition to the double bond, such as polymerization, Diels Alder additions, and the like.

It is therefore an object of the present invention to provide a novel process for the isomerization of unsaturated fatty acids and their derivatives. It is another object of the present invention to provide a catalytic process for the isomerization of unsaturated fatty acids and their derivatives which causes the cis-isomeric form to be converted to the trans-isomeric form and which furthermore involves a shift in the double bond towards the methyl end of the fatty acid radical. Other objects will become apparent from the following description and claims.

The isomerization process of the present invention comprises heating an unsaturated fatty acid or an unsaturated fatty acid derivative at a temperature of 500° to 700° F. in the presence of a catalyst obtained by depositing phosphoric acid on a micro-porous, fused glass. In a preferred embodiment of the present invention the isomerization is carried out in the presence of up to 5% of water based on the fatty material charged. As indicated above the process of the present invention causes the isomerization of cis- to trans-isomers and the shift of the double bond towards the methyl group of the fatty acid radical. The process is thus of value in the double bond isomerization of trans-isomers of fatty acid and fatty acid derivatives such as elaidic acid.

The unsaturated fatty acids and fatty acid derivatives employed in the isomerization process of the present invention generally contain from 12 to 26 carbon atoms in the fatty acid and preferably contain cis-ethylenic unsaturation. Suitable fatty acids include oleic acid, linoleic acid, palmitoleic acid, petroselenic acid, erucic acid, tetradecenoic acid, hexadecenoic acid, and the like. Mixtures of such acids as well as mixtures of such acids with saturated fatty acids can be employed. The term fatty acid derivative is meant to include fatty acid esters which can be monoesters or polyesters such as the monoglycerides, diglycerides, and triglycerides of the aforesaid acids. Naturally occurring glycerides such as vegetable seed or animal oils are examples of suitable starting materials. Such oils include soybean oil, cottonseed oil, olive oil, oitica oil, tung oil, linseed oil, perilla oil, lard oil, whale oil, and the like. The term acid esters also includes esters of the aforesaid acids with aliphatic alcohols of preferably 1 to 12 carbon atoms, exemplified by such ester radicals as methyl, ethyl, isopropyl, hexyl, cyclohexyl, heptyl, dodecyl, and the like. Mixed esters, partial esters, and mixed esters with saturated fatty acids can similarly be employed.

The catalyst employed in the process of the present invention comprises phosphoric acid deposited on microporous glass, i.e., glass comprising principally fused amorphous alkali metal silicates having average pore diameters of less than 200 angstroms. Although any micro-porous glass is suitable, the preferred supports for the phosphoric acid are the naturally occurring micro-porous glasses such as pumice. The phosphoric acid is generally deposited on the pumice in the form of orthophosphoric acid, and decomposes at the reaction temperatures to meta-phosphoric acid which is retained by the micro-porous glass. However, both forms can be employed and the term "phosphoric acid" as herein used includes both of these acids. The phosphoric acid is generally deposited by impregnation using a concentrated aqueous solution, 85 to 100%, followed by drying to remove excess water. The concentration of the phosphoric acid on the micro-porous glass is not critical and can be varied widely. Excess phosphoric acid not retained by the micro-porous glass will be vaporized during the reaction but does not interfere in the isomerization. Even minute concentrations of phosphoric acid on the micro-porous glass will result in some catalysis of the isomerization. Optimum concentrations of the phosphoric acid on the micro-porous glass will vary depending on the reaction conditions employed and the starting material involved. Such optimum conditions can be readily established experimentally by varying the concentration of the phosphoric acid on the microporous glass. In general, the concentration will vary from 1.0% to 40% by weight of the catalyst, the best results being generally obtained in the range of 20% by weight of the catalyst. The amount of catalyst employed will differ with the nature of the process employed. Thus, in a continuous process, a very large amount of catalyst in relation to the fatty acid compound is employed. In a batch process the quantity of catalyst employed will generally vary from 0.25 to 5% by weight of the fatty acid material.

As indicated hereinabove, the reaction is preferably carried out in the presence of small amounts of water, the function of which, however, has not been clearly established. It is believed that one function of the water is to prevent the decarboxylation of the fatty acid at the reaction temperature. It is to be understood, however, that the process of the present invention can be carried out in the absence of such water. Generally, the concentration of the water will be in the range of 0.5 to 5% by weight based on the fatty material charged. If water is employed in the isomerization of a fatty acid ester, the concentration of the water is generally maintained towards the lower end of the above-indicated range, in order to prevent hydrolysis of the acid ester.

The process is carried out at temperatures of 500° to 700° F. and preferably at temperatures of 630° to 670° F.

As indicated above, the process can be carried out on a batch or a continuous scale. In a batch reaction, the process is carried out at autogenous pressures, while in a continuous system the pressure can vary from 100 to 500 p.s.i. and higher. Reaction times will vary widely depending on the starting material and the reaction conditions, longer times being generally required at lower temperatures. For batch processes, reaction times of 2 to 6 hours are generally employed.

The invention is further illustrated by the following example.

EXAMPLE

Into a stainless steel pressure vessel were charged 400 g. of a commercially available oleic acid, 12 g. of a catalyst prepared by depositing on pumice 20% by weight of the catalyst of ortho-phosphoric acid and 12 g. of water. The commercial oleic acid contained in addition to octadecenoic acid, approximately 2.4% tetradecenoic acid, 12.9% hexadecenoic acid, as well as approximately 8% of saturated C-14 to C-18 acids. The reaction mixture was heated to 640° to 660° F. for a period of five hours during which time the pressure rose from 75 p.s.i. to 300 p.s.i. The reaction mixture was then cooled and the water drained off to give 374.5 g. of reaction product. This reaction product was distilled under vacuum at temperatures of 165° to 257° C. The distillate comprising the saturated and unsaturated fatty acids weighed 318.5 g., leaving a residue of about 50.0 g. This residue was identified as the dimer acid. Analysis of the distillate by infrared and hydrogenation as well as determination of the acid value (205), saponification value (202), and iodine value (74.9), showed the distillate to contain approximately 72% of trans-ethylenically unsaturated fatty acids, the remainder being saturated acids, part of which were in the starting material and part of which were formed as a by-product of the reaction. Tests for the polarity of the distillate showed that substantial shifting of the double bond to the 10, 11, and 12 positions had occurred. Gas chromatography of the hydrogenated acid product shows that very little methyl branching occurs as a result of the isomerization process as distinguished from such isomerization with activated clay.

The foregoing example illustrates the use of phosphoric acid on pumice in the isomerization of commercial oleic acid. Similar results are obtained if instead of the oleic acid an oleic acid ester, such as methyl oleate, olive oil, cottonseed oil, or soybean oil is employed. The trans-isomerized fatty compounds prepared by the process of the present invention find utility in the preparation of soap, coating compositions, and are of utility in the food industry. The process of the present invention has the additional advantage that it can be carried out simultaneously with reactions involving addition to the double bond such as Diels Alder reactions and the like.

It is to be understood that the invention as illustrated by the specific example hereinabove is not in any way limited thereto and that many and varied modifications of the invention can be made without departing from the spirit and scope thereof and are included in the present invention as defined in the appended claims.

What is claimed is:

1. A process for the cis to trans isomerization of fatty compounds selected from the class consisting of unsaturated fatty acids and esters of unsaturated fatty acids wherein the fatty acid has from 12 to 26 carbon atoms, which comprises contacting said fatty compound with a catalyst consisting essentially of phosphoric acid deposited on a micro-porous glass, at a temperature of 500° to 700° F.

2. The process of claim 1 wherein the fatty compound is oleic acid.

3. The process of claim 1 wherein the phosphoric acid is deposited on pumice.

4. The process of claim 3 wherein the concentration of phosphoric acid is from 0.1 to 40% by weight of the catalyst.

5. The process of claim 1 wherein the reaction is modified by the addition of 0.1 to 5% of water by weight of the fatty compound.

6. The process of claim 5 wherein the fatty unsaturated acid is oleic acid.

References Cited

UNITED STATES PATENTS

| 1,993,512 | 3/1935  | Ipatieff     | 260—683.15 |
| 2,378,005 | 6/1945  | Eckey        | 260—405.6  |
| 2,388,158 | 10/1945 | Kirschenbauer | 260—405.6 |
| 2,405,380 | 8/1946  | Turk et al.  | 260—405.6  |
| 2,421,842 | 6/1947  | Martin       | 206—405.6  |

FOREIGN PATENTS 621,812   4/1949   Great Britain.

NICHOLAS S. RIZZO, *Primary Examiner.*

R. J. GALLAGHER, *Assistant Examiner.*

UNITED STATES PATENT OFFICE
CERTIFICATE OF CORRECTION

Patent No. 3,389,156            June 18, 1968

Victor Lewis Larimer

It is certified that error appears in the above identified patent and that said Letters Patent are hereby corrected as shown below:

Column 2, line 36, "cricical" should read -- critical --; line 48, "1.0%" should read -- 0.1% --.

Signed and sealed this 13th day of January 1970.

(SEAL)
Attest:

Edward M. Fletcher, Jr.
Attesting Officer

WILLIAM E. SCHUYLER, JR.
Commissioner of Patents